United States Patent
Abe et al.

(10) Patent No.: US 11,835,137 B2
(45) Date of Patent: Dec. 5, 2023

(54) SEALING MEMBER FOR MECHANICAL SEALS

(71) Applicant: NOK CORPORATION, Tokyo (JP)

(72) Inventors: Shunsuke Abe, Kanagawa (JP); Hideyuki Murakami, Kanagawa (JP)

(73) Assignee: NOK CORPORATION, Tokyo (JP)

(*) Notice: Subject to any disclaimer, the term of this patent is extended or adjusted under 35 U.S.C. 154(b) by 317 days.

(21) Appl. No.: 16/647,552

(22) PCT Filed: Aug. 21, 2018

(86) PCT No.: PCT/JP2018/030829
§ 371 (c)(1),
(2) Date: Mar. 16, 2020

(87) PCT Pub. No.: WO2019/058840
PCT Pub. Date: Mar. 28, 2019

(65) Prior Publication Data
US 2020/0217418 A1    Jul. 9, 2020

(30) Foreign Application Priority Data
Sep. 19, 2017   (JP) .................................. 2017-178532

(51) Int. Cl.
| | | |
|---|---|---|
| *F16J 15/3284* | (2016.01) |
| *C08K 3/04* | (2006.01) |
| *C08K 3/22* | (2006.01) |
| *C08K 5/14* | (2006.01) |
| *C08L 15/00* | (2006.01) |
| *F04D 29/12* | (2006.01) |

(52) U.S. Cl.
CPC ............. *F16J 15/3284* (2013.01); *C08K 3/04* (2013.01); *C08K 3/22* (2013.01); *C08K 5/14* (2013.01); *C08L 15/005* (2013.01); *C08K 2003/2241* (2013.01); *F04D 29/126* (2013.01)

(58) Field of Classification Search
None
See application file for complete search history.

(56) References Cited

U.S. PATENT DOCUMENTS

| 5,852,093 A | 12/1998 | Aimura et al. |
| 2005/0038166 A1 | 2/2005 | Fukuchi et al. |
| 2005/0230923 A1 | 10/2005 | Kametaka et al. |
| 2007/0021565 A1 | 1/2007 | Horie et al. |
| 2009/0300900 A1 | 12/2009 | Kametaka et al. |
| 2014/0191477 A1 | 7/2014 | Kobayashi et al. |

FOREIGN PATENT DOCUMENTS

| JP | 8-100084 | 4/1996 |
| JP | 9-003246 | 1/1997 |
| JP | 9-132675 | 5/1997 |
| JP | 2000-212333 | 8/2000 |
| JP | 2001-354806 | 12/2001 |
| JP | 2003-342422 | 12/2003 |
| JP | 3676338 | 5/2005 |
| JP | 2005-265075 | 9/2005 |
| JP | 2005-285537 | 10/2005 |
| JP | 2009-102646 | 5/2009 |
| JP | 2014-77095 | 5/2014 |
| WO | 96/017015 | 6/1996 |
| WO | 2005/044912 | 5/2005 |
| WO | 2013/038835 | 3/2013 |
| WO | 2014/057663 | 4/2014 |

OTHER PUBLICATIONS

ISR issued in WIPO Patent Application No. PCT/JP2018/030829, dated Oct. 30, 2018, English translation.
IPRP issued in WIPO Patent Application No. PCT/JP2018/030829, dated Mar. 24, 2020, English translation.

*Primary Examiner* — Arrie L Reuther
(74) *Attorney, Agent, or Firm* — GREENBLUM & BERNSTEIN, P.L.C.

(57) ABSTRACT

A sealing member for mechanical seals, which is a peroxide vulcanized molded article of a hydrogenated nitrile rubber having a bound acrylonitrile content of less than 20% and an iodine number of 20 mg/100 g or less. The sealing member for mechanical seals is obtained as a peroxide vulcanized molded article of a hydrogenated nitrile rubber composition comprising 0 to 5 parts by weight of carbon black, 20 to 100 parts by weight of silica, and 0.5 to 3 parts by weight of silane coupling agent, based on 100 parts by weight of hydrogenated nitrile rubber, and preferably further compounding 50 parts by weight or less of titanium oxide non-reinforcing filler. The obtained vulcanized molded article is to provide a sealing member for mechanical seals that can achieve desired LLC resistance, and that has excellent compression set characteristics, cold resistance, processability, hardness, etc.

6 Claims, No Drawings

SEALING MEMBER FOR MECHANICAL SEALS

TECHNICAL FIELD

The present invention relates to a sealing member for mechanical seals. More particularly, the present invention relates to a sealing member for mechanical seals effectively used for water pumps, etc.

BACKGROUND ART

Water pumps are pumps using a long life coolant [LLC], which uses, as an antifreeze, an aqueous solution comprising ethylene glycol etc. as an active ingredient. The mechanical seal used therefor is described in Patent Document 1.

Cup gasket and bellows, which are static seals used as rubber members for mechanical seals and do not slide themselves, must have predetermined hardness and elastic modulus so as to seal gaps between members; thus, LLC resistance during softening and swelling is important.

Moreover, due to the recent increasing demand in cold districts, improvement of cold resistance is also required. Conventionally used nitrile rubber or hydrogenated nitrile rubber could not achieve desired cold resistance, due to themselves insufficient cold resistance. Further, it was difficult to satisfy both LLC resistance and cold resistance.

More specific the cup gasket and bellows are required to have the following properties:
(1) Since mechanical seals are used under conditions in which they are always in contact with sealing liquid, such as LLC, in an atmosphere circumstances of high temperature (to about 160° C.) and high pressure (up to 0.4 MPa), the mechanical seals, in which the cup gasket or bellows are used as their members, are required to have durability under such use conditions. An improvement in LLC resistance is needed on the assumption that the mechanical seals sufficiently exhibit their performance.
(2) If the LLC resistance of the cup gasket and bellows is insufficient, softening and swelling cause destruction (rupture) and design dimensional change, thereby resulting in the leakage of a large amount of LLC. In the worst-case scenario, a breakdown due to overheating occurs.

In order to solve these problems, Patent Document 2 discloses a rubber composition comprising fired clay and an organic peroxide in NBR or hydrogenated NBR having a nitrile content (AN content) of 36% or less, preferably 30% or less. The Document indicated that the rubber composition improves antifreeze resistance and adhesion. However, Zetpol 3110 (produced by Zeon Corporation; AN content: 25%) is used in the Examples, and it cannot be said that although there is LLC resistance (150° C., 300 hours), desired LLC resistance can be obtained.

Patent Document 3 discloses a rubber composition used in a state dipped in a radiator liquid, tie rubber composition not containing a zinc compound, but containing magnesium hydroxide. However, in Example 7, in which Zetpol 2020L (AN content: 36%) is used as hydrogenated nitrite rubber, desired LLC resistance was not obtained after all.

In addition, various proposals have been made for these types of hydrogenated NBR compositions.

Patent Document 4: A hydrogenated NBR composition comprising hydrogenated NBR having a bound AN content of 31 to 50%, preferably 35 to 50%, and an iodine number of 30 mg/100 mg or less, carbon black having a particle diameter of 61 nm or more and/or other fillers, a polyfunctional unsaturated compound co-crosslinking agent, and an organic peroxide. This composition has excellent roll processability, and can be suitably used as a vulcanization molding material for a cup gasket or bellows having excellent LLC resistance used in mechanical seals for water pumps.

As hydrogenated NBR, Zetpol 2011 (AN content: 36%), Zetpol 0020 (AN content: 49.2%), and Zetpol 2020 (AN content: 36%) are used in the Examples, and Zetpol 3010 (AN content: 25%) is used as a Comparative Example, which shows inferior LLC resistance.

Moreover. Patent Document 4 indicates that titanium oxide or the like is used as a filler other than carbon black, and that graphite, silica, clay, etc. are preferably used. The same applies to the Examples.

Patent Document 5: A hydrogenated NBR composition comprising hydrogenated NBR having a bound AN content of 15 to 30%, preferably 20 to 25%, white carbon having a specific surface area of 200 $m^2$/g or less, an organic peroxide, and a polyfunctional unsaturated compound. The Document indicated that this composition improves the heat resistance and low temperature characteristics of hydrogenated NBR, substantially without impairing the mechanical strength (normal state physical properties) and oil resistance inherent in the hydrogenated NBR; and that when the AN content is equal to or less than this range, oil resistance is inferior. However, there is no reference to LLC resistance. In the Examples thereof, hydrogenated NBR having an AN content of 25% is used.

Patent Document 6: A hydrogenated NBR composition comprising an organic peroxide and hydrogenated NBR having a bound AN content of 15 to 50%, preferably 20 to 45%, an iodine number of 20 to 70 g/100 g, and a Mooney viscosity $ML_{1+4}$ (100° C.) of 100 to 160. The Document indicated that this composition improves the heat resistance and compression set characteristics of hydrogenated NBR, substantially without impairing the mechanical strength (normal state physical properties) and oil resistance inherent in the hydrogenated NBR; and that when the AN content is equal to or less than this range, low temperature characteristics are superior, but oil resistance is inferior. In the Examples thereof, Zetpol 2020 or Zetpol 2030L, both of which have an AN content of 36%, is used.

Patent Document 7: A hydrogenated NBR-based seal molding material for R152a and R134a, comprising hydrogenated NBR having a bound AN content of 31 to 45%, white carbon having a specific surface area (based on the nitrogen adsorption method) of 30 to 200 $m^2$/g, a silane coupling agent, and an organic peroxide. This seal molding material has excellent resistance to both refrigerants R152a and R134a, as well as to all refrigerator oils and assembling oils etc. used for these refrigerants.

Patent Document 8: A hydrogenated NBR composition comprising hydrogenated NBR, white carbon having a specific surface area of about 20 to 200 $m^2$/g, and an organic peroxide. This composition can improves the heat resistance without impairing the mechanical strength (normal state physical properties) and oil resistance inherent in the hydrogenated NBR. In the Examples thereof, Zetpol 2000 having an AN content of 36% or Zetpol 1020 having an AN content of 44% is used.

Patent Document 9: A hydrogenated NBR composition comprising hydrogenated NBR, a reinforcing agent, $Fe_2O_3$ or $TiO_2$, and an organic peroxide. This composition provides a vulcanizate having excellent resistance to both refrigerants Freon R12 and Freon R134a, even when a relatively small amount of reinforcing agent is added. In the Examples, Zetpol 2010H or Zetpol 2020, both of which have an AN content of 36%, is used.

PRIOR ART DOCUMENT

Patent Document

Patent Document 1: JP-A-2005-265075
Patent Document 2: JP-A-2001-354806
Patent Document 3: JP-B-3676338
Patent Document 4: WO 2013/038835 A1
Patent Document 5: JP-A-2000-212333
Patent Document 6: JP-A-2003-342422
Patent Document 7: JP-A-2009-102646
Patent Document 8: JP-A-9-3246
Patent Document 9: JP-A-9-132675

OUTLINE OF THE INVENTION

Problem to be Solved by the Invention

An object of the present invention is to provide a sealing member for mechanical seals that can achieve desired LLC resistance, and that has excellent compression set characteristics, cold resistance, processability, hardness, etc.

Means for Solving the Problem

The above object of the present invention can be achieved by a sealing member for mechanical seals, which is a peroxide vulcanized molded article of hydrogenated nitrile rubber having a bound acrylonitrile content of less than 20% and an iodine number of 20 mg/100 g or less.

The sealing member for mechanical seals is obtained as a peroxide vulcanized molded article of a hydrogenated nitrile rubber composition comprising 0 to 5 parts by weight of carbon black, 20 to 100 parts by weight of silica, and 0.5 to 3 parts by weight of silane-based coupling agent, based on 100 parts by weight of hydrogenated nitrile rubber, and preferably further compounding 50 parts by weight or less of titanium oxide non-reinforcing filler.

Effect of the Invention

The sealing member for mechanical seals according to the present invention can achieve desired LLC resistance, has excellent compression set characteristics, cold resistance, processability, hardness, etc., and has a glass transition point Tg of lower than −35° C. after dipping in a 30 volume % LLC aqueous solution at 150° C. for 300 hours. In particular, the sealing member has excellent LLC resistance when used in combination with a titanium oxide non-reinforcing filler.

EMBODIMENTS FOR CARRYING OUT THE INVENTION

As hydrogenated NBR, one having a bound AN content of less than 20%, preferably 19 to 17%, and an iodine number of 20 mg/100 g or less, preferably 15 to 10 mg/100 g, is used. In practice, commercial products, such as the Zetpol series 4300, 4310, and 4320 (produced by Zeon Corporation), are used.

Patent Document 5 describes the use of hydrogenated NBR having a bound AN content of 15 to 30%, preferably 20 to 25%, and Patent Document 6 describes the use of hydrogenated NBR having an AN content of 15 to 50%, preferably 20 to 45%; however, these documents do not provide Examples using hydrogenated NBR having an AN content of less than 20%.

As silica, either of dry process silica and wet process silica can be used. Silica having a specific surface area of about 20 to 200 $m^2/g$ is generally used. In practice, commercial products, such as Nipseal LP (produced by Tosoh Silica Corporation) and Ultrasil 360 (produced by Evonik Degussa), are used.

Silica is used at a ratio of about 20 to 100 parts by weight, preferably about 25 to 80 parts by weight, based on 100 parts by weight of hydrogenated NBR, and is used at various ratios depending on the required product hardness. If the compounding ratio of silica is less than this range, the hardness of the vulcanizate becomes too low. In contrast, if silica is used at a ratio greater than this range, the hardness of the vulcanizate becomes too high.

As long as the object of the present invention is not inhibited, and in an amount to the extent of giving coloring, it is allowed to compound about 5 parts by weight or less of carbon black based on 100 parts by weight of hydrogenated NBR.

Examples of the silane-based coupling agent include vinyl group-, epoxy group-, or amino group-containing silane coupling agents, such as vinyltrichlorosilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldimethoxysilane, N-2-(aminoethyl)-3-aminopropylmethyldimethoxysilane, 3-aminopropyltrimethoxysilane, and N-phenyl-3-aminopropyltrimethoxysilane.

The silane-based coupling agent is used at a ratio of about 0.5 to 3 parts by weight, preferably about 0.5 to 1 part by weight, based on 100 parts by weight of hydrogenated NBR. If the compounding ratio of the silane-based coupling agent is less than this range, sufficient LLC resistance of the vulcanizate cannot the achieved. In contrast, if the silane-based coupling agent is used at a ratio greater than this range, the elongation of the vulcanizate is significantly reduced.

By compounding in the composition titanium oxide $TiO_2$ having an average particle diameter of about 0.05 to 10 μm at a ratio of about 50 parts by weight or less, preferably about 25 to 50 parts by weight, LLC resistance is further improved. Although titanium oxide is also used in Patent Documents 4 and 9, it is not to improve LLC resistance.

Examples of the organic peroxide include di-t-butyl peroxide, dicumyl peroxide, t-butylcumyl peroxide, 1,1-di(t-butylperoxy)-3,3,5-trimethylcyclohexane, 2,5-dimethyl-2,5-di(t-butylperoxy)hexane, 2,5-dimethyl-2,5-di(t-butylperoxy)hexyne-3,1,3-di(t-butylperoxyisopropyl) benzene, 2,5-dimethyl-2,5-di(benzoylperoxy)hexane, butylperoxy benzoate, t-butylperoxy isopropyl carbonate, n-butyl-4,4'-di(t-butylperoxy) valerate, and the like. The organic peroxide is used at a ratio of about 1 to 10 parts by weight, preferably about 2 to 8 parts by weight, based on 100 parts by weight of the hydrogenated NBR. When the compounding amount of organic peroxide is less than this range, any vulcanizate having sufficient crosslinking density cannot be obtained. In contrast, when the compounding amount is greater than this range, foaming occurs, and vulcanization-molding cannot be performed; or, if vulcanization-molding can be performed, rubber elasticity and elongation decrease.

Furthermore, preferred examples of the polyfunctional unsaturated compound co-crosslinking agent include difunctional or trifunctional (meth)acrylates, such as ethyleneglycol dimethacrylate, triethyleneglycol dimethacrylate, 1,4-butyleneglycol dimethacrylate, 1,6-hexanediol dimethacrylate, and trimethylolpropane trimethacrylate. Allyl-based co-crosslinking agents that are generally used in combination with organic peroxides, such as triallyl isocyanurate, triallyl cyanurate, triallyl trimellitate, and diallyl isocyanurate, can also be used. The term "(meth)acrylate" as used herein refers to acrylate or methacrylate.

The polyfunctional unsaturated compound co-crosslinking agent is used at a ratio of about 30 parts by weight or less, preferably 1 to 10 parts by weight, based on 100 parts by weight of the hydrogenated nitrile rubber.

The composition is prepared in the following manner. In addition to each of the above components, various compounding agents generally used in the rubber industry, such as processing aids (e.g., stearic acid, palmitic acid, or paraffin wax), acid acceptors (e.g., zinc oxide, magnesium oxide, or hydrotalcite), and antiaging agents, are suitably compounded (provided that the amount of plasticizer is 30 parts by weight or less), and the resulting mixture is kneaded using a kneading machine, such as an intermix, a kneader, or a Banbury mixer, and an open roll. The kneaded product is vulcanized generally by heating at about 150 to 200° C. for about 3 to 60 minutes using an injection molding machine, a compression molding machine, a vulcanization press, or the like, further optionally followed by oven vulcanization (secondary vulcanization) by heating at about 120 to 200° C. for about 1 to 24 hours, thereby vulcanization molding the resultant into a target product, i.e., a cup gasket or bellows of a mechanical seal for water pumps.

EXAMPLES

The following describes the present invention with reference to Examples.

Example 1

| | |
|---|---|
| Hydrogenated NBR-A (Zetpol 4310, produced by Zeon Corporation; AN content: 19%, iodine value: 15 mg/100 mg) | 100 parts by weight |
| Silica (Nipsil LP, produced by Tosoh Silica Corporation; specific surface area: 207 m²/g) | 80 parts by weight |
| Silane-based coupling agent (A-151NTJ SILANE, produced by Momentive Performance Materials Inc.) | 1 part by weight |
| Organic peroxide (Percumyl D, produced by NOF Corporation) | 5 parts by weight |

The above components were kneaded with a kneader and an open roll. The kneaded product (composition) was then subjected to press vulcanization at 180° C. for 6 minutes, and a vulcanized sheet (150×150×2 mm) was obtained.

The obtained vulcanized sheet and P-24 O ring were measured for each of the following items.

LLC resistance: The volume change rate after dipping in a 30 volume % LLC (JCC273K, produced by Japan Chemical Industries Co., Ltd.) aqueous solution at 150° C. for 300 hours was measured. A volume change rate of less than 2% was evaluated as ⊚, that of 2 to 4% was evaluated as ○, and that of 5% or more was evaluated as ×.

Compression set (CS): The compression set was measured at 120° C. for 70 hours according to JIS K6262 corresponding to ASTM D395. A compression set of less than 10% was evaluated as ⊚, that of 10 to 12% was evaluated as Δ, and that exceeding 12% was evaluated as ×.

Cold resistance: The glass transition point Tg was measured. A glass transition point of lower than −35° C. was evaluated as ○, and that of −34° C. or higher was evaluated as ×.

Processability: Kneading properties (kneader discharge properties) and moldability were compared and evaluated. When the kneader discharge properties and molding evaluation were both excellent, this case was evaluated as ○; when the kneader discharge properties were excellent, while the molding evaluation was defective, this case was evaluated as Δ; and when both were defective, this case was evaluated as ×.

Hardness: according to JIS K6253 corresponding to ASTM D2240.

Examples 1 to 6 are examples of high hardness (75 to 80), and Examples 7 to 9 are examples of low hardness (60).

Example 2

In Example 1, the same amount (100 parts by weight) of hydrogenated NBR-B (THERBAN 1707, produced by ARLANXEO; AN content: 17%) was used in place of the hydrogenated NBR-A.

Example 3

In Example 1, the amount of the silica was changed to 75 parts by weight, and 3 parts by weight of MT carbon black (THERMAX N990, produced by Cancarb Limited) and 30 parts by weight of titanium oxide (TIPAQUE A-100, produced by ISHIHARA SANGYO KAISHA, LTD.; an average particle diameter of 0.15 μm) were further compounded.

Example 4

In Example 1, the amount of the silica was changed to 70 parts by weight, and 5 parts by weight of MT carbon black (THERMAX N990) and 50 parts by weight of titanium oxide (TIPAQUE A-100) were further compounded.

Example 5

In Example 1, the amount of the silica was changed to 70 parts by weight.

Example 6

In Example 5, the amount of the silica was changed to 60 parts by weight, and 3 parts by weight of MT carbon black and 30 parts by weight of titanium oxide were further compounded.

Example 7

In Example 5, the amount of the silica was changed to 55 parts by weight, and 5 parts by weight of MT carbon black and 50 parts by weight of titanium oxide were further compounded.

Example 8

In Example 1, the amount of the silica was changed to 45 parts by weight.

Example 9

In Example 8, the amount of the silica was changed to 35 parts by weight, and 2 parts by weight of MT carbon black and 25 parts by weight of titanium oxide were further compounded.

Example 10

In Example 8, the amount of the silica was changed to 25 parts by weight, and 2 parts by weight of MT carbon black and 50 parts by weight of titanium oxide were further compounded.

Comparative Example 1

In Example 1, the same amount (100 parts by weight) of hydrogenated NBR-C (Zetpol 3110, produced by Zeon Corporation; AN content: 25%, iodine value: 15 mg/100 mg) was used in place of the hydrogenated NBR-A.

Comparative Example 2

In Example 1, the same amount (100 parts by weight) of hydrogenated NBR-C (Zetpol 3110) was used in place of the hydrogenated NBR-A, 90 parts by weight of MT carbon black was used in place of the silica and the silane coupling agent.

Comparative Example 3

In Example 1, 40 parts by weight of SRF carbon black (SEAST G-S, produced by Tokai Carbon Co., Ltd.) was used in place of the silica and the silane coupling agent.

Comparative Example 4

In Example 1, 125 parts by weight of SRF carbon black (SEAST G-S) was used in place of the silica and the silane coupling agent.

Comparative Example 5

In Example 1, 60 parts by weight of MT carbon black was used in place of the silica and the silane coupling agent.

Comparative Example 6

In Example 1, 140 parts by weight of MT carbon black was used in place of the silica and the silane coupling agent.

Comparative Example 7

In Example 1, 50 parts by weight of MT carbon black was used in place of the silica and the silane coupling agent, and 30 parts by weight of titanium oxide was further compounded.

Comparative Example 8

In Example 1, 50 parts by weight of MT carbon black was used in place of the silica and the silane coupling agent, and 30 parts by weight of calcium carbonate (Hakuenka CC, produced by Shiraishi Calcium Kaisha, Ltd.) was further compounded.

Comparative Example 9

In Example 1, 50 parts by weight of MT carbon black was used in place of the silica and the silane coupling agent, and 30 parts by weight of cellulose powder (KC FLOCK W-250 produced by Nippon Paper Industries Co., Ltd.) was further compounded.

Comparative Example 10

In Example 1, 50 parts by weight of MT carbon black was used in place of the silica and the silane coupling agent, and 30 parts by weight of barium sulfate (produced by Sakai Chemical Industry Co., Ltd.) was further compounded.

Table below shows the evaluation and measurement results obtained in Examples and Comparative Examples.

TABLE

| Example | LLC resistance | CS | Cold resistance | Processability | Hardness |
|---|---|---|---|---|---|
| Example 1 | ○ | ○ | ○ | ○ | 80 |
| Example 2 | ○ | ○ | ○ | ○ | 80 |
| Example 3 | ⊚ | ○ | ○ | ○ | 80 |
| Example 4 | ⊚ | ○ | ○ | ○ | 80 |
| Example 5 | ○ | ○ | ○ | ○ | 75 |
| Example 6 | ○ | ○ | ○ | ○ | 75 |
| Example 7 | ○ | ○ | ○ | ○ | 75 |
| Example 8 | ○ | ○ | ○ | ○ | 60 |
| Example 9 | ○ | ○ | ○ | ○ | 60 |
| Example 10 | ○ | ○ | ○ | ○ | 60 |
| Comparative Example 1 | ○ | ○ | X | Δ | 80 |
| Comparative Example 2 | ○ | ○ | X | ○ | 60 |
| Comparative Example 3 | X | ○ | ○ | X | 60 |
| Comparative Example 4 | X | ○ | ○ | ○ | 85 |
| Comparative Example 5 | ○ | ○ | ○ | X | 55 |
| Comparative Example 6 | X | ○ | ○ | ○ | 75 |
| Comparative Example 7 | ○ | Δ | ○ | Δ | 70 |
| Comparative Example 8 | ○ | X | ○ | Δ | 70 |
| Comparative Example 9 | X | X | ○ | Δ | 75 |
| Comparative Example 10 | X | ○ | ○ | Δ | 70 |

The invention claimed is:

1. A static sealing member, which is a peroxide vulcanized molded article of a hydrogenated nitrile rubber composition comprising 20 to 100 parts by weight of silica and 0.5 to 3 parts by weight of silane coupling agent, based on 100 parts by weight of hydrogenated nitrile rubber having a bound acrylonitrile content of less than 20% and an iodine number of 20 mg/100 g or less,
    wherein the static sealing member is
    a cup gasket or
    a bellows of a mechanical seal of a water pump.

2. The static sealing member for mechanical seals according to claim 1, wherein the hydrogenated nitrile rubber composition, in which 5 parts by weight or less of carbon black is further compounded, is used.

3. The sealing member for mechanical seals according to claim 2, which has a volume change rate of 4% or less after dipping in a 30 volume % LLC aqueous solution at 150° C. for 300 hours.

4. The static sealing member for mechanical seals according to claim 1, wherein the hydrogenated nitrile rubber composition, in which 50 parts by weight or less of titanium oxide non-reinforcing filler is further compounded, is used.

5. The sealing member for mechanical seals according to claim 4, which has a volume change rate of 4% or less after dipping in a 30 volume % LLC aqueous solution at 150° C. for 300 hours.

6. The sealing member for mechanical seals according to claim 1, which has a volume change rate of 4% or less after dipping in a 30 volume % LLC aqueous solution at 150° C. for 300 hours.

* * * * *